United States Patent Office.

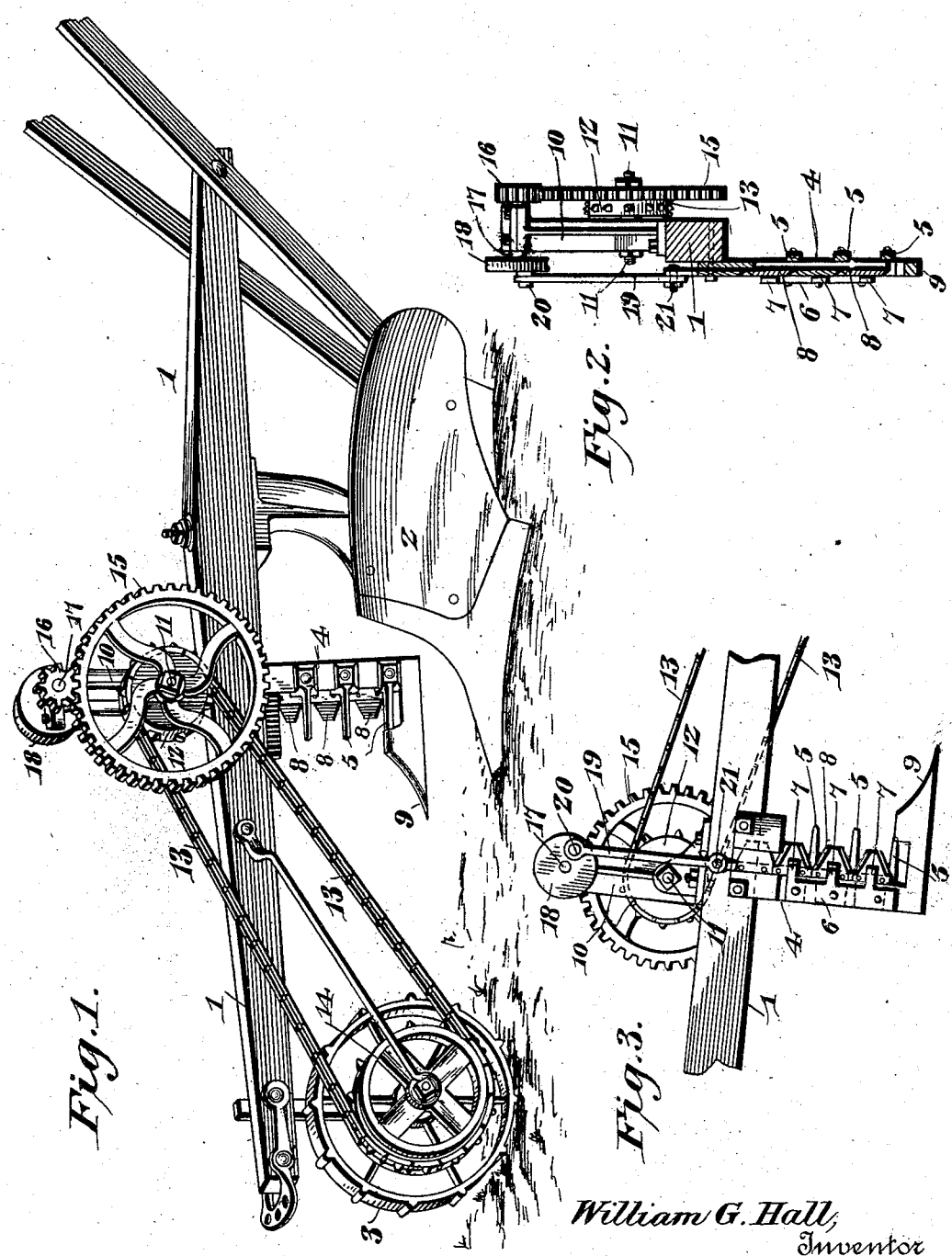

WILLIAM G. HALL, OF GRAFTON, WEST VIRGINIA.

PLOW ATTACHMENT.

SPECIFICATION forming part of Letters Patent No. 702,647, dated June 17, 1902.

Application filed August 21, 1901. Serial No. 72,831. (No model.)

*To all whom it may concern:*

Be it known that I, WILLIAM G. HALL, a citizen of the United States, residing at Grafton, in the county of Taylor and State of West Virginia, have invented a new and useful Plow Attachment, of which the following is a specification.

This invention relates to plows, and has for its object to facilitate the operation thereof when plowing through green forage—as, for instance, grass, corn or cotton stalks, and the like—and to provide for cutting such vegetation immediately in advance of the plow, so that the latter may not become clogged by the vegetation and in order that the latter may be conveniently turned over into the ground to rot, and thereby fertilize the soil.

It is furthermore designed to provide for conveniently applying the present invention to the beam of an ordinary plow without changing or altering the same and also to arrange for operating the cutting mechanism from the ground-wheel, which is ordinarily carried at the forward end of the plow-beam.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a plow having the present invention applied thereto. Fig. 2 is a transverse sectional view. Fig. 3 is a detail side elevation.

Like characters of reference designate corresponding parts in all the figures of the drawings.

Referring to the accompanying drawings, 1 designates an ordinary plow-beam, which carries any common form of plow 2 and is provided at its forward end with a supporting-wheel 3 for contact with the ground. These parts are common and well known and have been shown merely to illustrate the application and operation of the present invention.

In carrying out the invention there is provided an upright hanger 4, which is hung from the land-side face of the plow-beam and alined above the point of the plow. To the inner side of this hanger there is secured a plurality of forwardly-directed guard-fingers 5, similar to those employed in the cutting apparatus of a mowing-machine, and to the outer side of this hanger there is secured a guide-bar 6, having a plurality of forwardly-directed lugs or projections 7, which coöperate with the fingers to form a guideway for a vertically reciprocatory cutter-bar 8, which has the usual triangular cutter-blades, as commonly employed in mowing-machines. A pointed foot or shoe 9 is carried by the lower end of the hanger and is projected forwardly therefrom, so as to lie in vertical alinement with the point of the plow. Rising from the top of the beam and alined vertically with the hanger is a standard 10, which is provided near its lower end with a laterally-projected spindle 11, upon which is mounted a sprocket-wheel 12, that is designed to be driven by means of a sprocket-chain 13, traveling over a sprocket-wheel 14, carried by and rotating with the ground-wheel 3. Upon the outer end of the spindle 11 and rotatable therewith there is provided a gear-wheel 15, which is in mesh with an upper pinion 16, that is carried by the adjacent end of a spindle 17, which is projected in opposite directions through the upper end portion of the standard and carries upon its opposite end a crank-disk 18. Motion is transmitted from the crank-disk to the reciprocatory cutter-bar by means of a link or pitman 19, which has one end provided with a wrist-pin connection 20 with the crank-disk and its opposite end having a loose or wrist connection 21 with the upper end of the cutter-bar.

In the operation of the device the plow is manipulated as usual, whereby the ground-wheel is rotated, and through the medium of the sprocket-wheel, the intermeshed, gears and the pitman connection the cutter-bar is reciprocated in a vertical direction, thereby to cut the grass or other vegetation through which the plow is being worked. As the cutting apparatus is located just in front of the plow, it cuts the vegetation, so as to open a path for the plow, and thereby prevent the vegetation from hanging upon and clogging or obstructing the passage of the plow; also, as the vegetation is severed and loosened it can be readily turned aside by the moldboard, so as to effectually turn the cut grass or the like into the ground for the purpose of fertilizing the latter by the rotting of the vegetation.

From the foregoing description it is apparent that no change or alteration is required in an ordinary plow for the application of the present invention, and when applied it does not interfere with the usual manipulation of the plow, but, on the other hand, materially facilitates the working of the plow through long or high vegetation.

It is desired to call particular attention to the fact that the pointed foot or shoe 9 has its forward end located at or projected slightly beyond the extreme forward end of the plow-point, and the active portions of the cutter-blades work in a vertical plane slightly in advance of the point where the front cutting edge of the plow-point begins to rise, so as to cut the grass or the like slightly in advance of the plow-point, thereby to separate the grass and give unobstructed passage for the plow-point. Hence the plow-point does not engage with the uncut grass, and thus considerable strain and friction is removed from the plow.

What I claim is—

1. The combination with a plow-beam, and a plow carried thereby, of means for cutting vegetation located in advance of the plow-point with a space between the cutting means and the plow-point thereby to form an unobstructed passage through the vegetation for said plow-point.

2. The combination with a plow-beam having a plow, and a ground-wheel, of a vertically-reciprocatory cutting apparatus hung from the beam and alined in advance of the plow-point, with a space between the latter and the cutting apparatus and means for operating the cutting apparatus from the ground-wheel.

3. The combination with a plow-beam having a plow, and a ground-wheel, of a hanger hung from the beam and alined in advance of the plow-point, a pendent fingered bar carried by the hanger and provided at its lower end with a forwardly-projected shoe having a downwardly-inclined sharpened front end portion extended in front of the bar, a vertically-reciprocatory cutter-bar mounted upon the hanger in rear of the shoe and coöperating with the fingers, there being an open space between the cutting apparatus and the plow-point, and means for working the cutter-bar from the ground-wheel.

4. The combination with a plow-beam having a plow, and a ground-wheel, of a vertically-reciprocatory cutting apparatus hung from the beam in front of the plow-point, with an open space between the latter and the cutting apparatus a sprocket-wheel mounted upon the beam, another sprocket-wheel carried by the ground-wheel, a sprocket-chain connecting the two sprocket-wheels, a gear in operative relation to the first-mentioned sprocket-wheel, a crank-disk driven from the gear, and a pitman connection between the disk and the cutting apparatus.

5. The combination with a plow-beam having a plow, and a ground-wheel, of a hanger hung from the standard and alined in front of the plow-point, a forwardly-directed foot or shoe carried by the lower end of the hanger and located above the forward end of the plow-point, a reciprocatory cutter-bar mounted upon the hanger, a standard rising from the beam, a gear-wheel mounted upon the standard and in operative relation to the ground-wheel, a spindle carried by the upper end of the standard and projected at opposite sides thereof, a pinion carried by one end of the spindle and in mesh with the gear-wheel, a crank carried by the opposite end of the spindle, and a pitman connection between the crank and the cutting apparatus.

6. A plow attachment, comprising an upright hanger having means for connection with a plow-beam, and also provided with a forwardly-directed shoe at its lower end, forwardly-projected guard-fingers carried by the hanger, a vertically-reciprocatory cutter-bar mounted upon the hanger and in operative relation to the fingers, the cutting apparatus including the shoe being disposed for arrangement in front of the plow-point so as to have a clear space between the cutting apparatus and the plow, a standard having its foot provided with means for attachment to a plow-beam, a lower transverse spindle carried by the standard, an upper spindle carried by and projected at opposite sides of the standard, a drive-wheel mounted upon the lower spindle, means for operating the drive-wheel from the ground-wheel of a plow, a gear carried by the lower spindle, a pinion carried by one end of the upper spindle, a crank at the opposite end of said spindle, and a pitman connection between the crank and the cutter-bar.

7. The combination with a plow-beam having a plow, of a vertically-reciprocatory cutting apparatus hung from the beam and alined in advance of the plow-point, with a clear space between the latter and the cutting apparatus and means for operating the cutting apparatus.

In testimony that I claim the foregoing as my own I have hereto affixed my signature in the presence of two witnesses.

WILLIAM G. HALL.

Witnesses:
WM. E. JENKINS,
L. KITZMILLER.